(12) United States Patent
Inoue et al.

(10) Patent No.: US 11,248,520 B2
(45) Date of Patent: Feb. 15, 2022

(54) ENGINE SYSTEM

(71) Applicant: Mazda Motor Corporation, Hiroshima (JP)

(72) Inventors: Atsushi Inoue, Aki-gun (JP); Tetsuya Chikada, Higashihiroshima (JP); Yusuke Kawai, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 22 days.

(21) Appl. No.: 16/775,530

(22) Filed: Jan. 29, 2020

(65) Prior Publication Data
US 2020/0309019 A1    Oct. 1, 2020

(30) Foreign Application Priority Data

Apr. 1, 2019    (JP) .............................. JP2019-069737

(51) Int. Cl.
*F02B 1/12*    (2006.01)
*F02D 41/30*    (2006.01)
(Continued)

(52) U.S. Cl.
CPC ............ *F02B 1/12* (2013.01); *F02D 41/3041* (2013.01); *F02B 2023/108* (2013.01);
(Continued)

(58) Field of Classification Search
CPC  F02B 1/12; F02B 2023/108; F02B 2075/125; F02B 23/0696; F02B 23/101; F02B 33/446; F02B 31/08; F02B 39/12; F02D 41/3041; F02D 41/006; F02D 3041/0015; F02D 2200/101; Y02T 10/12;
(Continued)

(56) References Cited

U.S. PATENT DOCUMENTS 10,677,185 B2 *   6/2020  Inoue ...................... F02D 23/02
2008/0077304 A1 * 3/2008  Suzuki .................... F02D 37/02
                                                    701/102
(Continued)

FOREIGN PATENT DOCUMENTS

JP      2006037815 A    2/2006
WO      2018096745 A1   5/2018

*Primary Examiner* — Phutthiwat Wongwian
*Assistant Examiner* — Susan E Scharpf
(74) *Attorney, Agent, or Firm* — Alleman Hall Creasman & Tuttle LLP

(57) ABSTRACT

An engine system capable of controlling an intake air flow includes a combustion chamber, an ignition plug, an intake air flow control valve, and a controller. The controller performs, in at least a part of an operating range, SPCCI combustion in which after jump-spark ignition combustion of a portion of a mixture gas inside the combustion chamber by a jump-spark ignition of the ignition plug, compression ignition combustion of the remaining mixture gas is carried out by a self-ignition. The controller strengthens, at least in a part of the operating range of SPCCI combustion, the intake air flow inside the combustion chamber by controlling the intake air flow control valve. The controller controls, in a middle-load range of the operating range where SPCCI combustion is performed, the intake air flow control valve so that the intake air flow becomes weaker than in a high-load range and a low-load range.

9 Claims, 8 Drawing Sheets

(51) Int. Cl.
    *F02B 23/10*    (2006.01)
    *F02B 75/12*    (2006.01)
    *F02D 41/00*    (2006.01)
(52) U.S. Cl.
    CPC ...... *F02B 2075/125* (2013.01); *F02D 41/006* (2013.01); *F02D 2041/0015* (2013.01); *F02D 2200/101* (2013.01)
(58) Field of Classification Search
    CPC .. Y02T 10/40; F02M 26/03; F02M 35/10163; F02P 5/1502
    See application file for complete search history.

(56) References Cited

U.S. PATENT DOCUMENTS

| | | | | |
|---|---|---|---|---|
| 2009/0259387 | A1* | 10/2009 | Kakuya | F02D 37/02 701/103 |
| 2011/0108001 | A1* | 5/2011 | Lee | F02B 23/101 123/305 |
| 2011/0320104 | A1* | 12/2011 | Sellnau | F02D 41/0052 701/103 |
| 2014/0331959 | A1* | 11/2014 | Doran | F02D 41/3041 123/27 R |
| 2018/0216592 | A1* | 8/2018 | Sakai | F02D 41/3041 |

* cited by examiner

ENGINE SYSTEM

TECHNICAL FIELD

The present disclosure relates to an engine system, and particularly to the engine system which can control an intake air flow.

BACKGROUND OF THE DISCLOSURE

JP2006-37815A discloses an intake air control device for an engine. This intake air control device opens and closes an intake air control valve according to an engine speed and a load to generate an intake air rotational flow, such as a swirl flow, inside a combustion chamber of the engine.

Moreover, WO2018/096745A1 discloses a control device for an engine. The control device for the engine controls the engine so that jump-spark ignition combustion (SI combustion), and partial compression ignition combustion (SPCCI combustion) which is a combination of SI combustion and compressed self-ignition combustion (CI combustion) are performed according to the operating condition of the engine. Moreover, the control device of WO2018/096745A1 changes an opening of a swirl control valve according to the operating condition of the engine to strengthen the swirl flow inside the combustion chamber, thereby generating stable SPCCI combustion.

As disclosed in JP2006-37815A and WO2018/096745A1, the intake air rotational flow, such as the swirl flow, is an effective technology for stabilizing combustion inside the combustion chamber. Particularly, like the control device of WO2018/096745A1, in the engine control which performs SPCCI combustion, the intake air flow is an important technology for securing the combustion stability because an operating condition with a large amount of internal exhaust gas recirculation (internal EGR amount) may be set. However, when the intake air flow is used frequently to improve combustion stability, cooling loss increases and fuel efficiency deteriorates.

SUMMARY OF THE DISCLOSURE

Therefore, one purpose of the present disclosure is to provide an engine system capable of reducing a generation of a cooling loss, while securing sufficient combustion stability.

An engine system capable of controlling an intake air flow includes a combustion chamber, an ignition plug disposed inside the combustion chamber, an intake air flow control valve configured to generate an intake air flow inside the combustion chamber, and a controller configured to control the ignition plug and the intake air flow control valve. The controller performs, in at least a part of an operating range, partial compression ignition combustion in which after jump-spark ignition combustion of a portion of a mixture gas inside the combustion chamber by a jump-spark ignition of the ignition plug, compression ignition combustion of the remaining mixture gas inside the combustion chamber is carried out by a self-ignition. The controller strengthens, at least in a part of the operating range of the partial compression ignition combustion, the intake air flow inside the combustion chamber by controlling the intake air flow control valve. The controller controls, in a given middle-load range of the operating range where the partial compression ignition combustion is performed, the intake air flow control valve so that the intake air flow becomes weaker than in a high-load range where the load is higher than the middle-load range and a low-load range where the load is lower than the middle-load range.

According to this configuration, in the given middle-load range, the intake air flow control valve is controlled so that the intake air flow becomes weaker than in the high-load range and the low-load range. Here, in the middle-load range, combustion stability is high even if the partial compression ignition combustion is carried out, and combustion is securely carried out even if the intake air flow is weakened. By weakening the intake air flow in the middle-load range, the cooling loss can be reduced, while securing sufficient combustion stability.

The intake air flow control valve may be a swirl control valve configured to generate a swirl flow inside the combustion chamber. The swirl flow is a rotational flow of which the rotational central axis is oriented to the axial direction of the piston, and thus, generally, the vortex flow is difficult to attenuate during a compression stroke. According to this configuration, since the swirl control valve which generates the swirl flow inside the combustion chamber is used as the intake air flow control valve, combustion stability can be effectively improved by the intake air flow.

The controller may control the ignition plug so that an ignition timing is retarded in the high-load range where the partial compression ignition combustion is performed. In the high-load range, it is preferred to perform a retarded combustion in order to reduce combustion noise, but it tends to cause a misfire. According to this configuration, since the intake air flow is strengthened in the high-load range where the partial compression ignition combustion is performed and the misfire is easily caused, the stable combustion can be obtained, while combustion noise is reduced.

The engine system may further include an intake valve configured to introduce intake air into the combustion chamber, and an exhaust valve configured to discharge exhaust gas after combustion inside the combustion chamber. The controller may control the intake valve and the exhaust valve, in the low-load range where the partial compression ignition combustion is performed, to increase an amount of internal exhaust gas recirculation.

Generally, if the internal exhaust gas recirculation amount is increased in the low-load range, combustion stability may be deteriorated. According to this configuration, since the intake air flow is strengthened in the low-load range where the partial compression ignition combustion is performed, sufficient combustion stability can be secured, even if the internal exhaust gas recirculation amount is increased.

The ignition plug may be disposed in a circumferential part inside the combustion chamber. According to this configuration, since the ignition plug is disposed in the circumferential part inside the combustion chamber, the deterioration of the cooling loss caused by the intake air flow around the ignition plug can be reduced.

The ignition plug may be disposed in the circumferential part inside the combustion chamber on the side where the intake valve is provided. According to this configuration, since the ignition plug is disposed in the circumferential part inside the combustion chamber on the side where the intake valve is provided, the deterioration of the cooling loss caused by the intake air flow near the intake side where the ignition plug is disposed can be reduced.

A method of controlling an intake air flow, comprising the steps of controlling an ignition plug disposed inside a combustion chamber and an intake air flow control valve configured to generate an intake air flow inside the combustion chamber to perform, in at least a part of an operating range, partial compression ignition combustion in which after jump-spark ignition combustion of a portion of a mixture gas inside the combustion chamber by a jump-spark ignition of the ignition plug, compression ignition combustion of the remaining mixture gas inside the combustion chamber is carried out by a self-ignition, strengthening, at least in a part of the operating range of the partial compression ignition combustion, the intake air flow inside the combustion chamber by controlling the intake air flow control valve, and controlling, in a given middle-load range of the operating range where the partial compression ignition combustion is performed, the intake air flow control valve so that the intake air flow becomes weaker than in a high-load range where the load is higher than the middle-load range and a low-load range where the load is lower than the middle-load range.

DETAILED DESCRIPTION OF THE DISCLOSURE

Figure 1:
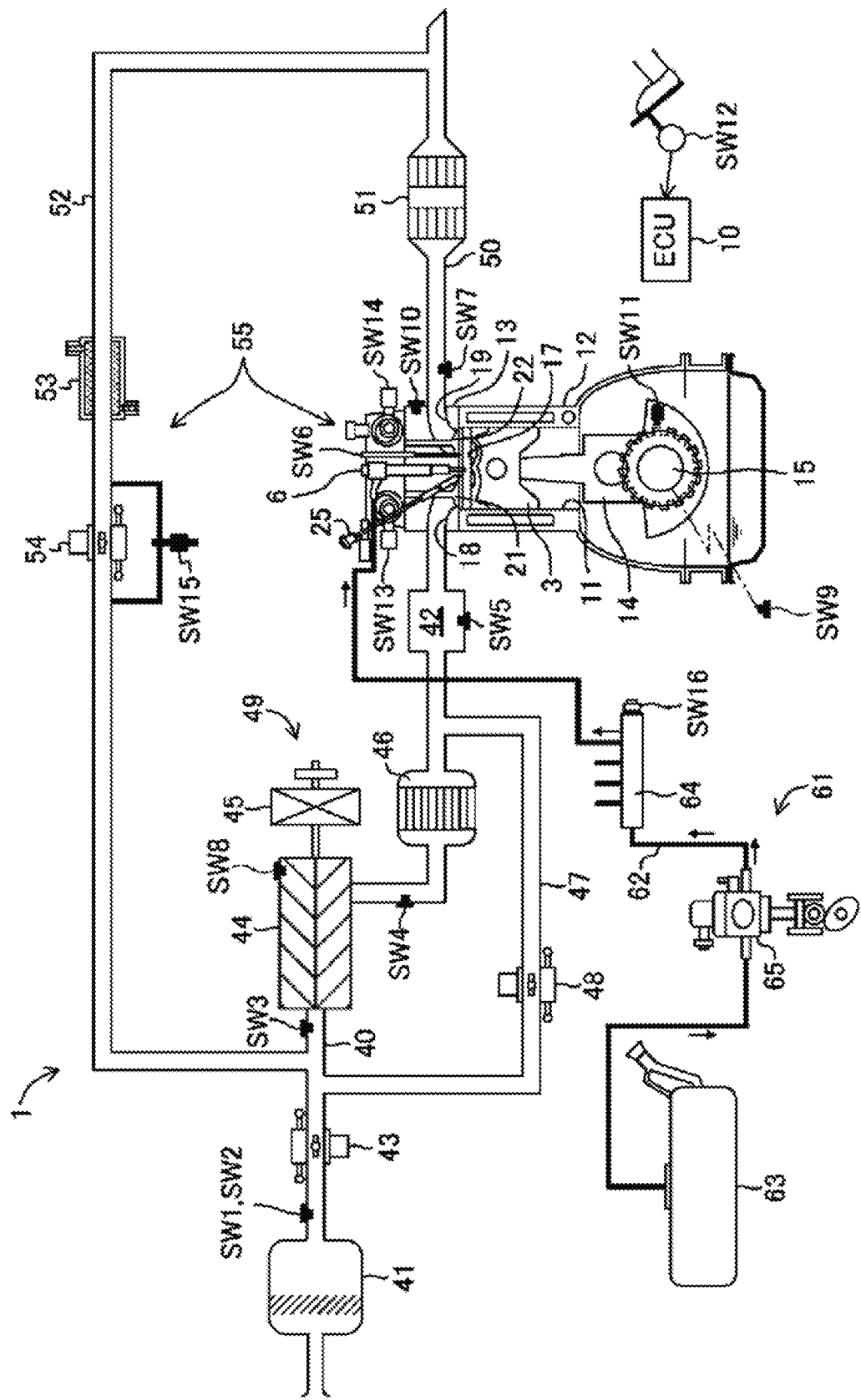
FIG. 1 is a view illustrating a configuration of an engine system according to one embodiment of the present disclosure.
Figure 2:
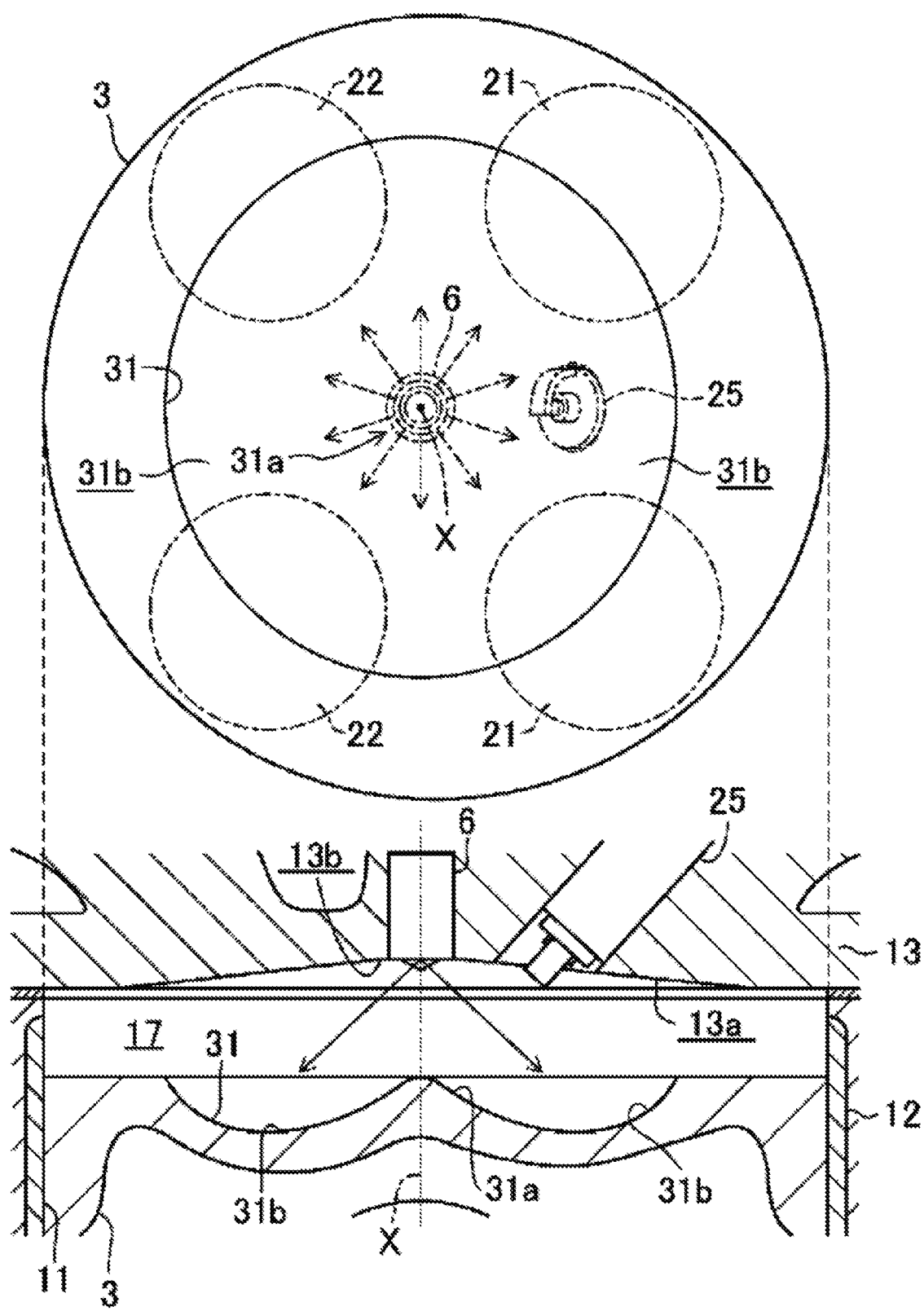
FIG. 2 is a cross-sectional view illustrating a configuration of a combustion chamber of an engine in the engine system according to the embodiment of the present disclosure.
Figure 3:
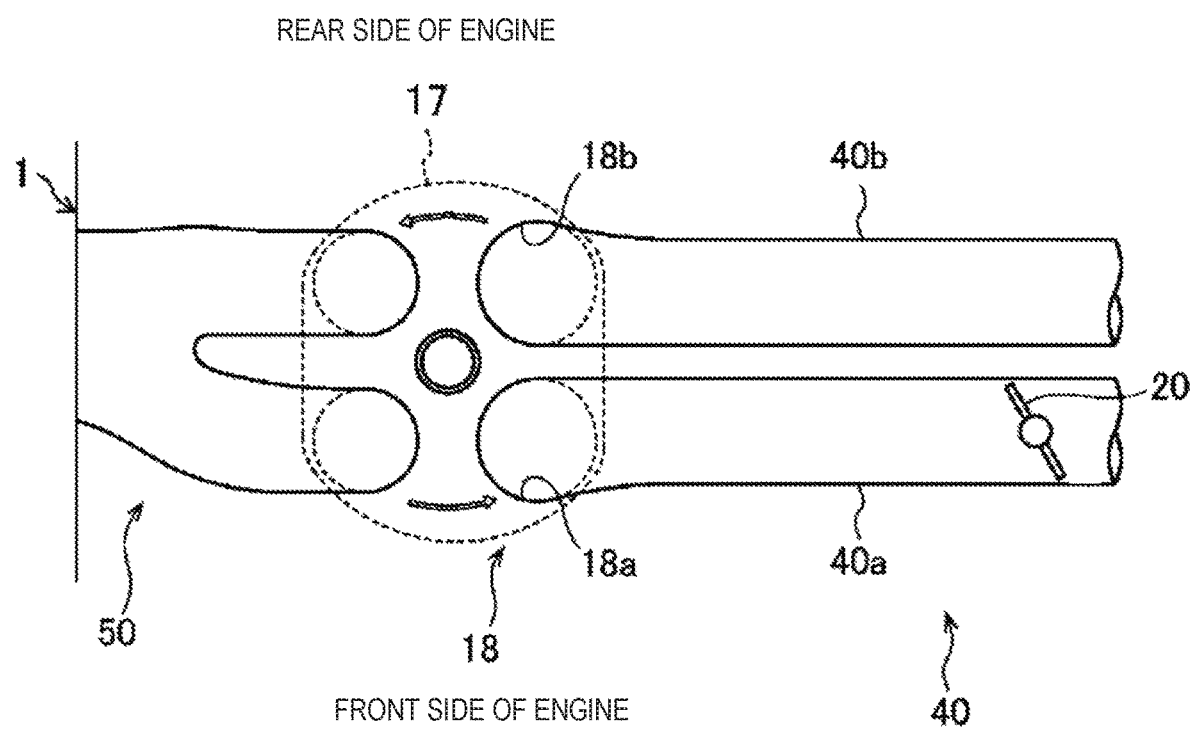
FIG. 3 is a plan view illustrating a configuration of the combustion chamber of the engine and an intake system in the engine system according to the embodiment of the present disclosure.
Figure 4:
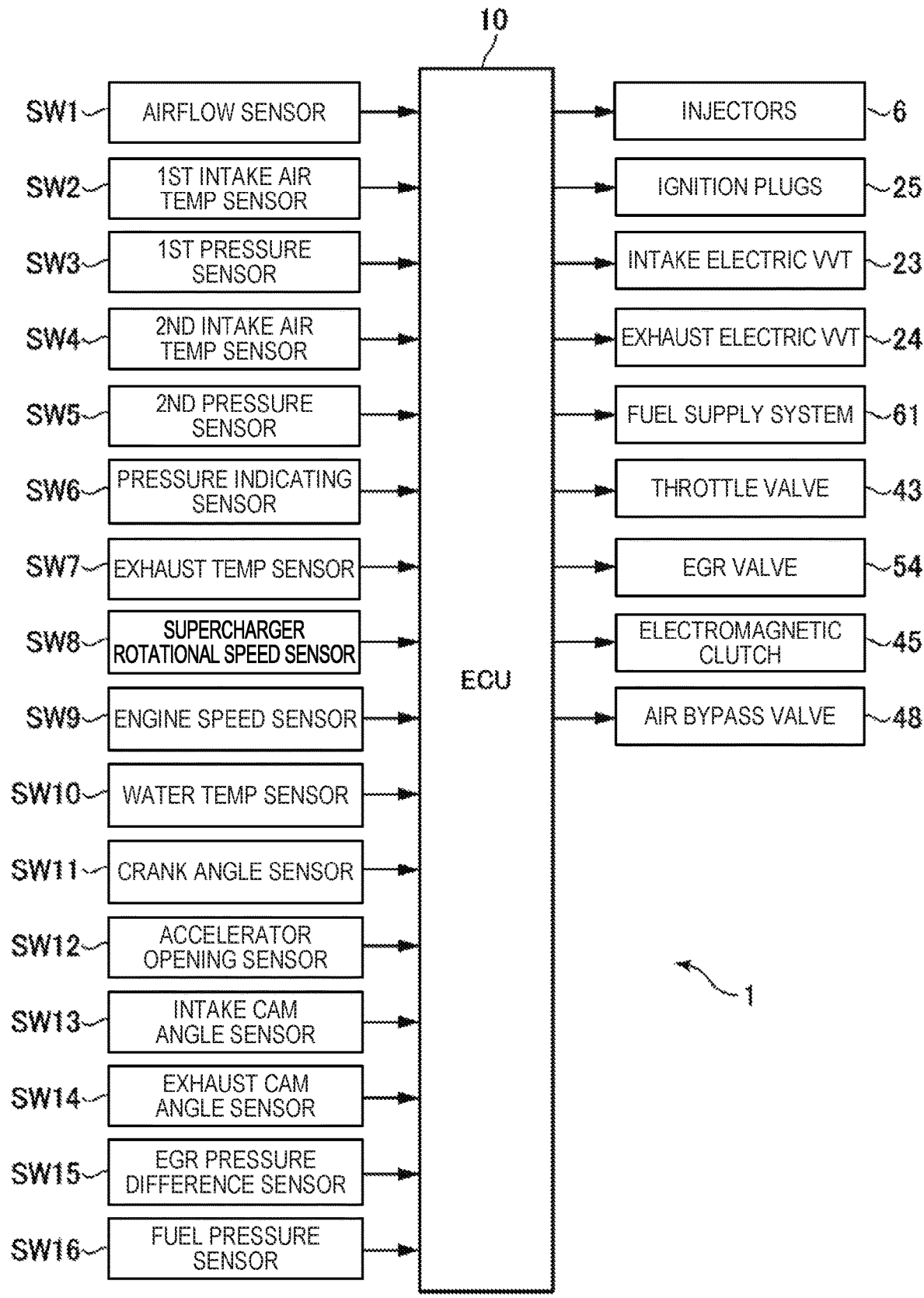
FIG. 4 is a block diagram illustrating a configuration of the engine system according to the embodiment of the present disclosure.

Hereinafter, an engine system capable of controlling an intake air flow according to one embodiment of the present disclosure is described with reference to the accompanying drawings.
<System Configuration>
First, referring to FIGS. 1 to 4, a configuration of the engine system according to a first embodiment of the present disclosure is described. FIG. 1 is a view illustrating the configuration of the engine system according to this embodiment. FIG. 2 is a cross-sectional view illustrating a configuration of the combustion chamber of an engine in the engine system according to this embodiment. FIG. 3 is a plan view illustrating a configuration of the combustion chamber of the engine and an intake system in the engine system according to this embodiment. Note that in FIG. 1, the intake side is on the left side of the drawing, and the exhaust side is on the right side of the drawing. In FIG. 2, the intake side is on the right side of the drawing, and the exhaust side is on the left side of the drawing. In FIG. 3, the rear side of the engine is upward in the drawing, and the front side is downward in the drawing. FIG. 4 is a block diagram illustrating the configuration of the engine system according to this embodiment.

In this embodiment, an engine system 1 is a gasoline engine which performs partial compression ignition combustion (SPark Controlled Compression Ignition: SPCCI) mounted on a four-wheel automobile. In detail, the engine system 1 is provided with a cylinder block 12 and a cylinder head 13 placed on the cylinder block 12. A plurality of cylinders 11 are formed inside the cylinder block 12. In FIGS. 1 and 2, although only one cylinder 11 is illustrated, the engine system 1 is a multi-cylinder engine in this embodiment.

A piston 3 is slidably inserted in each cylinder 11. The piston 3 is coupled to a crankshaft 15 through a connecting rod 14. The piston 3, together with the cylinder 11 and the cylinder head 13, define a combustion chamber 17. Note that the term "combustion chamber" as used herein is not limited to the meaning of a space formed when the piston 3 reaches a compression top dead center. The term "combustion chamber" may be used in a broader sense. That is, the "combustion chamber" may refer to a space formed by the piston 3, the cylinder 11, and the cylinder head 13, regardless of the position of the piston 3.

As illustrated in FIG. 2, an upper surface of the piston 3 is a flat surface. A cavity 31 is formed in the upper surface of the piston 3. The cavity 31 is dented from the upper surface of the piston 3. The cavity 31 has a shallow dish shape. The cavity 31 faces an injector 6 (described later) when the piston 3 is located near a compression top dead center.

The cavity 31 has a convex part 31a. The convex part 31a is formed substantially at the center of the cylinder 11. The convex part 31a has a substantially cone shape, and extends upwardly along a center axis X of the cylinder 11 from the bottom of the cavity 31. An upper end of the convex part 31a is located at the almost same height as the upper surface of the cavity 31. The cavity 31 also has a dented part 31b formed around the convex part 31a.

As illustrated in FIG. 2, a lower surface of the cylinder head 13, i.e., a ceiling surface of the combustion chamber 17, is comprised of a slope 13a and a slope 13b. The slope 13a ascends from the intake side toward the center axis X. The slope 13b ascends from the exhaust side toward the center axis X. The ceiling surface of the combustion chamber 17 has a so-called pent-roof shape. Note that the shape of the combustion chamber 17 is not limited to the shape illustrated in FIG. 2. For example, the shape of the cavity 31, the shape of the upper surface of the piston 3, the shape of the ceiling surface of the combustion chamber 17, etc. can be changed suitably.

The geometric compression ratio of the engine system 1 is set high for the purpose of an improvement in theoretical thermal efficiency, and stabilization of CI (Compression Ignition) combustion (described later). In detail, the geometric compression ratio of the engine system 1 is 17:1 or higher. For example, the geometric compression ratio may be 18:1. The geometric compression ratio may be set suitably within a range of 17:1 or higher and 20:1 or lower.

Two intake ports 18 (FIG. 1) are formed in the cylinder head 13 for each cylinder 11. The intake ports 18 communicate with the combustion chamber 17. An intake valve 21 is disposed in each intake port 18. The intake valve 21 opens and closes the passage between the combustion chamber 17 and the intake port 18. The intake valve 21 is opened and closed at a given timing by an intake valve operating mechanism. In this embodiment, the intake valve operating mechanism has an intake electric VVT (Variable Valve Timing) 23 (FIG. 4) which is a variable valve operating mechanism. The intake electric VVT 23 is configured to continuously change a rotational phase of an intake cam shaft within a given angle range. Therefore, an open timing and a close timing of the intake valve 21 can be changed continuously. Note that the intake valve operating mechanism may have a VVT of a liquid pressure type, instead of the electric VVT.

Two exhaust ports 19 (FIG. 1) are formed in the cylinder head 13 for each cylinder 11. The exhaust ports 19 communicate with the combustion chamber 17. An exhaust valve 22 is disposed in each exhaust port 19. The exhaust valve 22 opens and closes a passage between the combustion chamber 17 and the exhaust port 19. The exhaust valve 22 is opened and closed at a given timing by an exhaust valve operating mechanism. In this embodiment, the exhaust valve operating mechanism has an exhaust electric VVT 24 (FIG. 4) which is a variable valve operating mechanism. The exhaust electric VVT 24 is configured to continuously change a rotational phase of an exhaust cam shaft within a given angle range. Therefore, an open timing and a close timing of the exhaust valve 22 can be changed continuously. Note that the exhaust valve operating mechanism may have a VVT of a liquid pressure type instead of the electric VVT.

Although the details are described later, in this embodiment, the engine system 1 uses the intake electric VVT 23 and the exhaust electric VVT 24 to adjust a length of an overlap period of opening of the intake valve 21 and opening of the exhaust valve 22. Therefore, it can purge the residual gas inside the combustion chamber 17, or confine hot burnt gas inside the combustion chamber 17 (i.e., introduce internal EGR (Exhaust Gas Recirculation) gas into the combustion chamber 17). In this example configuration, the intake electric VVT 23 and the exhaust electric VVT 24 constitute an internal EGR system. Note that the internal EGR system is not necessarily comprised of the VVTs.

As illustrated in FIG. 2, the injector 6 is attached to the cylinder head 13 for every cylinder 11. The injector 6 is configured to directly inject fuel into the combustion chamber 17. The injector 6 is disposed at a valley part of the pent roof where an intake-side slope 13a intersects with an exhaust-side slope 13b. Moreover, the injector 6 is disposed so that its injection axial center is oriented along the center axis X of the cylinder 11. The injection axial center of the injector 6 is substantially in agreement with the position of the convex part 31a of the cavity 31. The injector 6 opposes to the cavity 31. Note that the injection axial center of the injector 6 does not need to be in agreement with the center axis X of the cylinder 11. Also in such a case, it is desirable that the injection axial center of the injector 6 is in agreement with the position of the convex part 31a of the cavity 31.

Although detailed illustration is omitted, the injector 6 is comprised of a multiple nozzle hole type fuel injection valve having a plurality of nozzle holes. As illustrated by arrows in FIG. 2, the injector 6 injects fuel so that the fuel spray spreads radiately from the center of the combustion chamber 17.

As will be described later, the injector 6 may inject fuel at a timing where the piston 3 is located near a compression top dead center. In that case, when the injector 6 injects fuel, the fuel spray flows downwardly along the convex part 31a of the cavity 31, while being mixed with fresh air, and then flows so as to spread radiately outward from the center of the combustion chamber 17 along the bottom surface and the circumferential surface of the dented part 31b. Then, a mixture gas reaches the opening of the cavity 31, and then flows toward the center of the combustion chamber 17 from radially outward, along the intake-side slope 13a and the exhaust-side slope 13b. Note that the injector 6 is not limited to a multiple nozzle hole type injector. The injector 6 may adopt an outward lifting valve type injector.

As illustrated in FIG. 1, the injector 6 is connected to a fuel supply system 61. The fuel supply system 61 is provided with a fuel tank 63 constituted so as to store fuel, and a fuel supply path 62 which couples the fuel tank 63 to the injector 6. The fuel supply path 62 is provided with a fuel supply pump 65 and a common rail 64. The fuel supply pump 65 is configured to pump fuel to the common rail 64. In this embodiment, the fuel supply pump 65 is a plunger-type pump driven by the crankshaft 15. The common rail 64 is configured to store at a high fuel pressure the fuel pumped from the fuel supply pump 65. When the injector 6 opens, the fuel stored in the common rail 64 is injected into the combustion chamber 17 from the nozzle holes of the injector 6. The fuel supply system 61 is configured to supply high-pressure fuel at 30 MPa or higher to the injector 6. The maximum fuel pressure of the fuel supply system 61 may be about 120 MPa, for example. The pressure of the fuel supplied to the injector 6 may be changed according to the operating state of the engine system 1. Note that the configuration of the fuel supply system 61 is not limited to the above configuration.

An ignition plug 25 is attached to the cylinder head 13 for every cylinder 11. The ignition plug 25 forcibly ignites the mixture gas inside the combustion chamber 17. As illustrated in FIG. 2, the ignition plug 25 is disposed at the intake side with respect to the center axis X of the cylinder 11 in this embodiment. Moreover, the ignition plug 25 is located between the two intake ports 18. The ignition plug 25 is attached to the cylinder head 13 while inclining downwardly toward the center of the combustion chamber 17. Electrodes of the ignition plug 25 are located near the ceiling surface of the combustion chamber 17 while facing to the combustion chamber 17.

As illustrated in FIG. 1, an intake passage 40 is connected to one side surface of the engine system 1. The intake passage 40 communicates with the intake port 18 of each cylinder 11. The intake passage 40 is a passage through which gas to be introduced into the combustion chamber 17 flows. An air cleaner 41 which filters fresh air is disposed at an upstream end of the intake passage 40. A surge tank 42 is disposed near a downstream end of the intake passage 40. Although detailed illustration is omitted, the intake passage 40 downstream of the surge tank 42 constitutes an independent passage which branches to every cylinder 11. A downstream end of the independent passage is connected to the intake ports 18 of each cylinder 11.

A throttle valve 43 is disposed between the air cleaner 41 and the surge tank 42 in the intake passage 40. The throttle valve 43 is configured to adjust its opening to adjust an amount of fresh air introduced into the combustion chamber 17.

A supercharger 44 is disposed downstream of the throttle valve 43 in the intake passage 40. The supercharger 44 is configured to boost gas introduced into the combustion chamber 17. In this embodiment, the supercharger 44 is a mechanical supercharger driven by the engine system 1. The mechanical supercharger 44 may be a roots type, for example. The mechanical supercharger 44 may have any kind of configuration. The mechanical supercharger 44 may be Lysholm type or a centrifugal type.

An electromagnetic clutch 45 is provided between the supercharger 44 and the output shaft of the engine system 1. The electromagnetic clutch 45 transmits a driving force from the engine system 1 to the supercharger 44, and intercepts the transmission of the driving force, between the supercharger 44 and the engine system 1. As will be described later, the supercharger 44 is switched between ON and OFF by the ECU 10 (FIG. 4) switching between a connected state and a disconnected state of the electromagnetic clutch 45. That is, this engine system 1 is configured to switch between the supercharger 44 boosting gas introduced into the combustion chamber 17, and the supercharger 44 not boosting gas introduced into the combustion chamber 17.

An intercooler 46 is disposed downstream of the supercharger 44 in the intake passage 40. The intercooler 46 is configured to cool gas compressed by the supercharger 44. The intercooler 46 may be configured to be a water-cooled type, for example.

A bypass passage 47 is connected to the intake passage 40. The bypass passage 47 connects an upstream part of the supercharger 44 and a downstream part of the intercooler 46 in the intake passage 40 to bypass the supercharger 44 and the intercooler 46. An air bypass valve 48 which is a bypass control valve is disposed in the bypass passage 47. The air bypass valve 48 adjusts a flow rate of gas which flows through the bypass passage 47.

When the supercharger 44 is turned OFF (i.e., when the electromagnetic clutch 45 is disconnected), the air bypass valve 48 is fully opened. Therefore, the gas which flows through the intake passage 40 bypasses the supercharger 44, and is introduced into the combustion chamber 17 of the engine system 1. The engine system 1 is operated in a non-boosted state, i.e., a naturally aspired state. When the supercharger 44 is turned ON (i.e., when the electromagnetic clutch 45 is connected), a portion of gas which passed the supercharger 44 flows back upstream of the supercharger 44 through the bypass passage 47. Since an amount of a reverse flow rate can be adjusted by adjusting the opening of the air bypass valve 48, the boosting pressure of the gas introduced into the combustion chamber 17 can be adjusted. In this example configuration, a supercharging system 49 is comprised of the supercharger 44, the bypass passage 47, and the air bypass valve 48.

An exhaust passage 50 is connected to the other side surface of the engine system 1. The exhaust passage 50 communicates with the exhaust ports 19 of each cylinder 11. The exhaust passage 50 is a passage through which exhaust gas discharged from the combustion chamber 17 flows. Although detailed illustration is omitted, an upper part of the exhaust passage 50 constitutes an independent passage which branches to every cylinder 11. An upstream end of the independent passage is connected to the exhaust ports 19 of each cylinder 11. An exhaust emission control system having one or more catalytic converters 51 is disposed in the exhaust passage 50. The catalytic converter 51 is comprised of a three-way catalyst. Note that the exhaust emission control system is not limited to those only including the three-way catalyst.

An EGR passage 52 which constitutes an external EGR system is connected between the intake passage 40 and the exhaust passage 50. The EGR passage 52 is a passage for recirculating a portion of burnt gas to the intake passage 40. An upstream end of the EGR passage 52 is connected to the exhaust passage 50 downstream of the catalytic converter 51. A downstream end of the EGR passage 52 is connected to the intake passage 40 upstream of the supercharger 44.

An EGR cooler 53 of a water-cooled type is disposed in the EGR passage 52. The EGR cooler 53 is configured to cool burnt gas. An EGR valve 54 is also disposed in the EGR passage 52. The EGR valve 54 is configured to adjust a flow rate of burnt gas which flows through the EGR passage 52. By adjusting the opening of the EGR valve 54, an amount of the cooled burnt gas, i.e., a recirculating amount of the external EGR gas, can be adjusted.

In this embodiment, an EGR system 55 is comprised of an external EGR system comprised of the EGR passage 52 and the EGR valve 54, and the internal EGR system comprised of the intake electric VVT 23 and the exhaust electric VVT 24 which are described above.

As illustrated in FIG. 3, the engine system 1 has a swirl control valve 20 which is an intake air flow control valve for strengthening the intake air flow inside the combustion chamber 17. The intake passage 40 connected to each combustion chamber 17 of the engine system 1 is comprised of a first intake passage 40a and a second intake passage 40b which are two passages extending in parallel to each other. In this embodiment, the first intake passage 40a is provided to the front side of the engine and is connected to a first intake port 18a, and the second intake passage 40b is provided to the rear side of the engine and is connected to a second intake port 18b. The swirl control valve 20 is disposed inside the first intake passage 40a. That is, the swirl control valve 20 is an opening adjusting valve which is capable of choking the cross section of the first intake passage 40a. When the opening of the swirl control valve 20 is small, since an intake air flow rate which flows into the combustion chamber 17 from the first intake port 18a among the first intake port 18a and the second intake port 18b which are lined up in the front-and-rear direction of the engine system 1 relatively decreases, and an intake air flow rate which flows into the combustion chamber 17 from the second intake port 18b relatively increases, the swirl flow inside the combustion chamber 17 becomes stronger. When the opening of the swirl control valve 20 is large, the intake air flow rates which flow into the combustion chamber 17 from the respective first intake port 18a and second intake port 18b become substantially equal to each other, and the swirl flow inside the combustion chamber 17 becomes weaker. When the swirl control valve 20 is fully opened, the swirl flow will not occur. Note that as illustrated by arrows, the swirl flow circles in a counterclockwise direction in FIG. 3.

Note that for the generation of the intake air flow, instead of attaching the swirl control valve 20 to the intake passage 40, or in addition to attaching the swirl control valve 20 to the intake passage 40, the opening periods of the two intake valves 21 may be shifted, and the intake air may be introduced into the combustion chamber 17 only from one of the intake valves 21. Since the intake air can be introduced unequally into the combustion chamber 17 by opening only one of the two intake valves 21, the swirl flow can be generated inside the combustion chamber 17. Further, the swirl generating part may generate the intake air flow inside the combustion chamber 17 by devising the shape of the intake port(s) 18.

In this embodiment, since each intake port 18 is a tumble port provided with an inclination with respect to the center axis X of the cylinder 11, a slanted swirl flow having a tumble component and a swirl component is formed inside the combustion chamber 17. Although an inclination angle of the slanted swirl flow is generally about 45° with respect to a plane perpendicular to the center axis X of the cylinder 11, it is suitably set within a range from 30° to 60° according to the specification of the engine system 1.

As illustrated in FIG. 4, the engine system 1 is provided with an ECU (Engine Control Unit) 10 for operating this system. The ECU 10 is a controller based on a well-known microcomputer, and is provided with a processor (e.g., a central processing unit (CPU)) which executes software programs, memory which is comprised of, for example, RAM (Random Access Memory) and/or ROM (Read Only Memory) and stores the software programs and data, and an input/output bus which inputs and outputs an electrical signal. The ECU 10 is one example of a controller.

As illustrated in FIGS. 1 and 4, the ECU 10 is connected to various kinds of sensors SW1-SW16. The sensors SW1-SW16 output respective detection signals to the ECU 10. The sensor includes the following sensors.

That is, the sensors include an airflow sensor SW1 which detects a flow rate of fresh air which flows through the intake passage 40 and a first intake air temperature sensor SW2 which detects the temperature of fresh air, which are disposed downstream of the air cleaner 41 in the intake passage 40, a first pressure sensor SW3 which is disposed downstream of the connecting position of the EGR passage 52 to the intake passage 40 and upstream of the supercharger 44, and detects the pressure of gas flowing into the supercharger 44, a second intake air temperature sensor SW4 which is disposed downstream of the supercharger 44 in the intake passage 40 and upstream of the connecting position of the bypass passage 47 to the intake passage 40, and detects the temperature of gas flowed out of the supercharger 44, a second pressure sensor SW5 which is attached to the surge tank 42 and detects the pressure of gas downstream of the supercharger 44, a pressure indicating sensor SW6 which is attached to the cylinder head 13 corresponding to each cylinder 11 and detects the pressure inside each combustion chamber 17 (in-cylinder pressure), an exhaust temperature sensor SW7 which is disposed in the exhaust passage 50 and detects the temperature of exhaust gas discharged from the combustion chamber 17, a supercharger rotational speed sensor SW8 which is attached to the supercharger 44 and detects the rotational speed of the supercharger 44, an engine speed sensor SW9 which is disposed near the output shaft of the engine system 1 and detects the rotational speed of the output shaft, a water temperature sensor SW10 which is attached to the engine system 1 and detects the temperature of coolant, a crank-angle sensor SW11 which is attached to the engine system 1 and detects the rotational angle of the crankshaft 15, an accelerator opening sensor SW12 which is attached to an accelerator pedal mechanism and detects the accelerator opening corresponding to the operating amount of the accelerator pedal, an intake cam angle sensor SW13 which is attached to the engine system 1 and detects the rotational angle of the intake cam shaft, an exhaust cam angle sensor SW14 which is attached to the engine system 1 and detects the rotational angle of the exhaust cam shaft, an EGR pressure difference sensor SW15 which is disposed in the EGR passage 52 and detects the pressure difference between upstream and downstream of the EGR valve 54, and a fuel pressure sensor SW16 which is attached to the common rail 64 of the fuel supply system 61 and detects the pressure of fuel supplied to the injector 6.

The ECU 10 determines the operating state of the engine system 1 based on these detection signals, and calculates a controlled variable of each device. The ECU 10 outputs control signals corresponding to the calculated controlled variables to the injector 6, the ignition plug 25, the swirl control valve 20, the intake electric VVT 23, the exhaust electric VVT 24, the fuel supply system 61, the throttle valve 43, the EGR valve 54, the electromagnetic clutch 45 of the supercharger 44, and the air bypass valve 48. For example, the ECU 10 adjusts the boosting pressure by adjusting the opening of the air bypass valve 48 based on the pressure difference between before and after the supercharger 44 obtained from the detection signals of the first pressure sensor SW3 and the second pressure sensor SW5. Moreover, the ECU 10 adjusts an amount of the external EGR gas introduced into the combustion chamber 17 by adjusting the opening of the EGR valve 54 based on the pressure difference between before and after the EGR valve 54 obtained from the detection signal of EGR pressure difference sensor SW15.

Moreover, the ECU 10 controls the intake valve 21, the exhaust valve 22, the ignition plug 25, and the swirl control valve 20 based on the signals detected by the engine speed sensor SW9 and the accelerator opening sensor SW12 to control combustion inside the cylinder.

Figure 5:
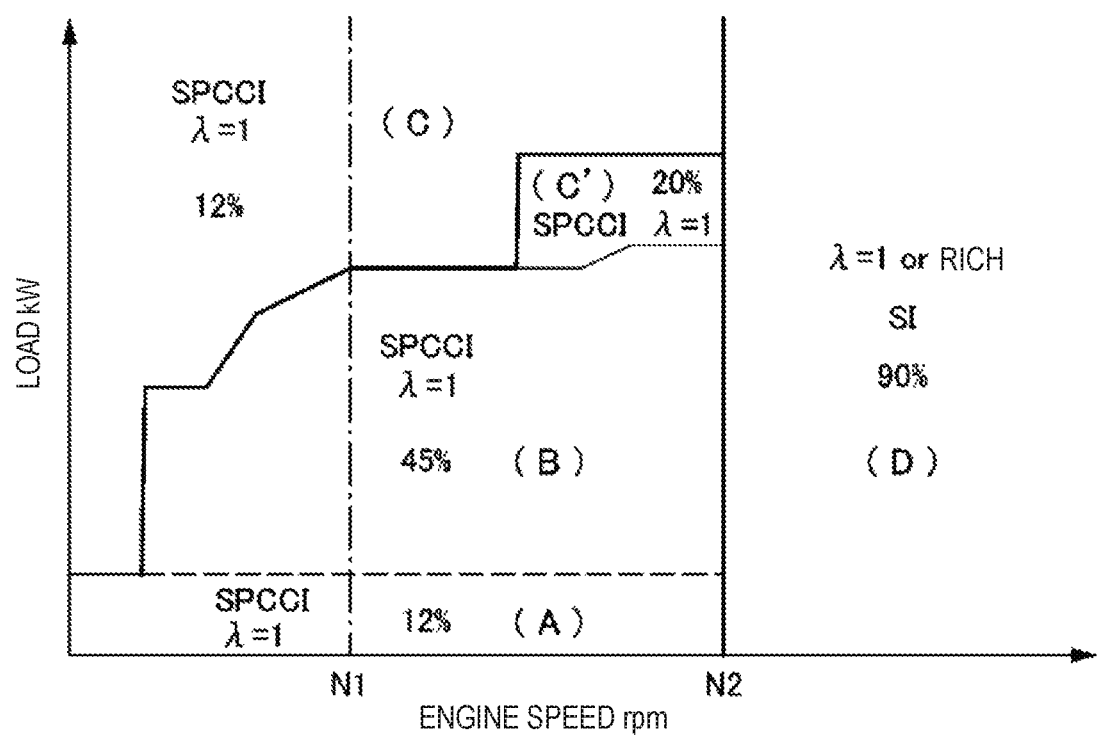
FIG. 5 is a view illustrating one example of an operating range map during a warmup of the engine system according to the embodiment of the present disclosure.
Figure 6:
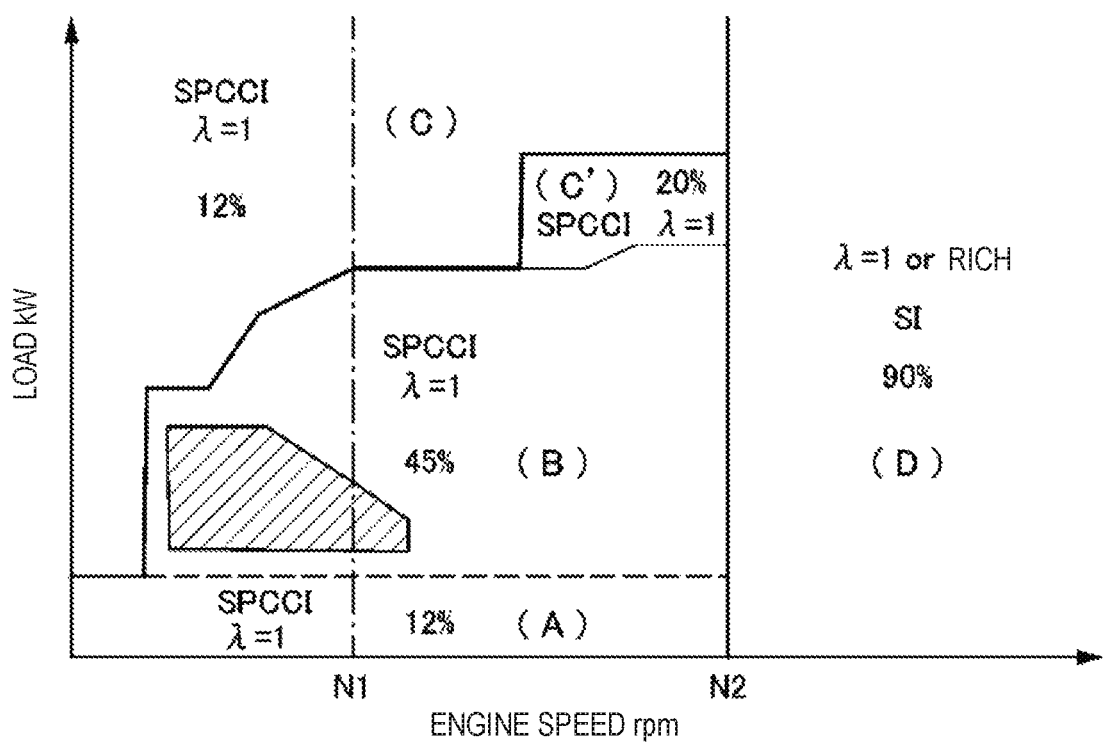
FIG. 6 is a view illustrating one example of the operating range map after warmup of the engine system according to the embodiment of the present disclosure.

Next, an engine operating range is described with reference to FIGS. 5 and 6. FIG. 5 illustrates an operating range map during a warmup of the engine system 1, and FIG. 6 illustrates the operating range map after the warmup is finished. As one example, the operating range map illustrated in FIG. 5 is applied when the coolant temperature of the engine system 1 is lower than 80° C., and the operating range map illustrated in FIG. 6 is applied when the coolant temperature is 80° C. or higher. Moreover, the opening of the swirl control valve 20 in each range is also illustrated in FIGS. 5 and 6.

The operating range of the engine system 1 is defined according to the engine load and the engine speed, and is roughly divided into five ranges depending on the load and the speed. In detail, the five ranges is comprised of a low-load range (A) which includes an idle operation and extends in a range of low speed and middle speed, a middle-load range (B) in which the load is higher than the low-load range and extends in the range of low speed and middle speed, a high-load range (C) in which the load is substantially higher than the middle-load range (B) and which includes a full load which extends in the range of low speed and middle speed, a high-load middle-speed range (C') located in the middle-speed range at high load, and a high-speed range (D) where the engine speed is higher than the low-load range (A), the middle-load range (B), the high-load range (C), and the high-load middle-speed range (C').

Here, the low-speed range, the middle-speed range, and the high-speed range are defined by substantially equally dividing the entire operating range of the engine system 1 into three ranges in this order from the engine speed being low to high. In the example of FIGS. 5 and 6, the low speed is defined as an engine speed lower than an engine speed N1, the high speed is defined as an engine speed N2 or higher, the middle speed is defined as the engine speed N1 or higher and lower than the engine speed N2. For example, the engine speed N1 may be 1200 rpm, and the engine speed N2 may be 4000 rpm. Moreover, the high-load range (C) may be a range where the combustion pressure is 900 kPa or higher.

The engine system 1 performs combustion by a compressed self-ignition in the low-load range (A), the middle-load range (B), the high-load range (C), and the high-load middle-speed range (C') mainly for the purpose of improving the fuel efficiency and the exhaust emission control performance. The engine system 1 performs combustion by a jump-spark ignition in the high-speed range (D). Below, operation of the engine system 1 in the respective ranges of the low-load range (A), the middle-load range (B), the high-load (C), the high-load middle-speed range (C'), and the high-speed range (D) is described.

In FIGS. 5 and 6, when the engine system 1 operates in the low-load range (A), the fuel injection amount is small and the temperature inside the combustion chamber 17 is low. Therefore, CI combustion (compressed self-ignition combustion) in which a self-ignition is occurred by reaching a given pressure and a given temperature is difficult to be carried out stably. Since there is little fuel, a spark ignition is difficult and SI combustion (jump-spark ignition combustion) tends to become unstable. An air-fuel ratio (A/F) of the combustion chamber 17 in the low-load range (A) of the engine system 1 is set to a stoichiometric air-fuel ratio (A/F=14.7:1). However, in the low-load range (A), the internal exhaust recirculation amount (internal EGR amount) is large, and a value of a gas-fuel ratio (G/F) is made into lean. Note that G/F of the mixture gas means a weight ratio of all the gas to fuel inside the combustion chamber 17. On the other hand, in the low-load range (A), the opening of the swirl control valve 20 is set to 12%, thereby strengthening the intake air flow and securing sufficient combustion stability.

For example, since the mixture gas of which G/F exceeds 30:1 is slow in flame propagation even if it can be ignited by a jump-spark ignition, combustion is difficult to progress, and thereby, stable SI combustion cannot be performed. On the other hand, if G/F is around 25:1 (20:1 to 35:1), stable SI combustion can be performed and generation of $NO_x$ can be reduced. Therefore, the engine system 1 performs SPCCI combustion (partial compression ignition combustion) which is a combination of SI combustion and CI combustion in the low-load range (A). In addition, by applying a control technology of a mixture gas distribution utilizing the swirl flow, stable SPCCI combustion can be performed in the low-load range of the engine system 1, and combustion with low $NO_x$ and low fuel consumption can be realized.

In detail, a small amount of fuel with which a lean mixture gas of which G/F exceeds 30:1 is formed inside the entire combustion chamber 17 is injected into the combustion chamber 17, and a stratified mixture gas distribution having an area which is located in the central part of the combustion chamber 17 where the ignition plug is disposed and becomes a trigger of the ignition (e.g., G/F is 20:1 or higher and 35:1 or lower), and an area which is located in a circumferential part of the combustion chamber 17 and where compression ignition is carried out by a combustion pressure and combustion heat of the ignition trigger (e.g., G/F is 35:1 or higher and 50:1 or lower) is formed inside the combustion chamber 17 at an ignition timing.

In SPCCI combustion, the ignition plug 25 forcibly ignites the mixture gas inside the combustion chamber 17 to cause the mixture gas to carry out SI combustion by flame propagation, and when the temperature inside the combustion chamber 17 increases by a heat generation of SI combustion and the pressure inside the combustion chamber 17 then increases by flame propagation, unburnt mixture gas carries out CI combustion by self-ignition.

By adjusting the calorific power of SI combustion, a variation in the temperature inside the combustion chamber 17 before a start of compression can be absorbed. Therefore, even if the temperature inside the combustion chamber 17 before the start of compression varies, the timing of self-ignition can be controlled, for example, by adjusting the ignition timing to adjust the start timing of SI combustion. When performing SPCCI combustion, the ignition plug 25 ignites the mixture gas near a compression top dead center, more precisely, at a given timing before the compression top dead center, thereby starting the combustion by flame propagation.

In order to improve fuel efficiency of the engine system 1, the EGR system 55 introduces EGR gas into the combustion chamber 17, while the engine system 1 operates in the low-load range (A). When the engine system 1 operates in the low-load range (A), the ECU 10 controls so that fuel is injected from the injector 6 at a pressure within a range of 30 MPa to 120 MPa, as described above. Moreover, when the engine system 1 operates in the low-load range (A), the air-fuel ratio (A/F) is leaner than the stoichiometric air-fuel ratio throughout the combustion chamber 17. That is, an excess air factor $\lambda$ of the mixture gas exceeds 1 throughout the combustion chamber 17. In this way, a generation of raw $NO_x$ can be reduced and the exhaust emission control performance can be improved.

Next, also when the engine system 1 operates in the middle-load range (B), the engine system 1 performs SPCCI combustion, similar to the low-load range (A). The EGR system 55 introduces EGR gas into the combustion chamber 17, when the operating state of the engine system 1 is in the middle-load range (B). Moreover, when the engine system 1 operates in the middle-load range (B), the air-fuel ratio (A/F) of mixture gas is substantially the stoichiometric air-fuel ratio (A/F=14.7:1) throughout the combustion chamber 17. The exhaust emission control performance of the engine system 1 becomes appropriate by the three-way catalyst purifying exhaust gas discharged from the combustion chamber 17. The A/F of the mixture gas may fall within a purification window of the three-way catalyst. Therefore, the excess air factor $\lambda$ of the mixture gas may be set to 1.0±0.2.

Moreover, in the middle-load range (B), the opening of the swirl control valve 20 is set to 45%, thereby weakening the intake air flow (swirl flow) more than that in the low-load range (A). That is, in the middle-load range (B), since the ignition is comparatively easy, sufficient combustion stability can be secured even if the intake air flow is weakened. By weakening the intake air flow inside the combustion chamber 17, cooling loss can be reduced and fuel efficiency can be improved.

Further, the "SPCCI lean range" illustrated by hatching in FIG. 6, is set to a low-load and low-speed range of the middle-load range (B), and in this range, the air-fuel ratio (A/F) is set higher than the stoichiometric air-fuel ratio (A/F=14.7:1). That is, in the "SPCCI lean range" after the warmup is finished, since the ignition becomes easier, the air-fuel ratio (A/F) is made higher than the stoichiometric air-fuel ratio to further improve the fuel efficiency. Note that in the "SPCCI lean range," when it is in a "State 1" with the coolant temperature being lower than 100° C. and the intake air temperature being lower than 25° C., the opening of the swirl control valve 20 is set to 0% (fully closed). Moreover, in the "SPCCI lean range," when it is in a "State 2" with the coolant temperature being 100° C. or higher and the intake air temperature being 25° C. or higher, the opening of the swirl control valve 20 is set to 43%. That is, when the temperatures are comparatively low in the "SPCCI lean range," the swirl flow inside the combustion chamber 17 is strengthened to improve the combustibility, and on the other hand, when the temperatures are high, the swirl flow is weakened to reduce cooling loss.

When the engine system 1 operates in the middle-load range (B), the injector 6 injects fuel into the combustion chamber 17 in two stages, an early-stage injection and a late-stage injection. The early-stage injection injects fuel at a timing separated from the ignition timing, and the late-stage injection injects fuel at a timing near the ignition timing. For example, the early-stage injection may be performed in the second half of an intake stroke, and the late-stage injection may be performed in the second half of the compression stroke. The first half and the second half of the intake stroke and the compression stroke may be the first half and the second half when bisecting the intake stroke and the compression stroke by the crank angle.

The injector 6 injects fuel radiately from a plurality of inclined nozzle holes, radially outwardly from the central part of the combustion chamber 17. Since the piston 3 is separated from a top dead center when the injector 6 performs the early-stage injection during a period in the first half of the compression stroke, the injected fuel spray reaches outside the cavity 31 in the upper surface of the piston 3 which is ascending toward the top dead center. Since the piston 3 is close to the top dead center when the injector 6 performs the late-stage injection in the second half of the compression stroke, the injected fuel spray enters into the cavity 31. The fuel injected by the late-stage injection forms the mixture gas in an area inside the cavity 31.

In connection with the injection of fuel into the cavity 31 by the late-stage injection, a flow of gas occurs in an area within the cavity 31. The turbulence energy inside the combustion chamber 17 decreases with the progress of the compression stroke, if the period of time to the ignition timing is long. However, since the injection timing of the late-stage injection is closer to the ignition timing than the early-stage injection, the ignition plug 25 can ignite the mixture gas in the area within the cavity 31, while the turbulence energy in the cavity 31 is kept high. Therefore, a combustion rate of SI combustion increases. When the combustion rate of SI combustion increases, a controllability of CI combustion by SI combustion increases, as described above.

By the injector 6 performing the early-stage injection and the late-stage injection, a substantially homogeneous mixture gas is formed (excluding the SPCCI lean range) inside the entire combustion chamber 17, where the excess air factor $\lambda$ becomes 1.0±0.2. Since the mixture gas is substantially homogeneous, the fuel efficiency can be improved by reducing unburned fuel loss, and the exhaust emission control performance can be improved by avoiding a generation of smoke. The excess air factor $\lambda$ is preferably 1.0 to 1.2.

By the ignition plug 25 igniting the mixture gas at the given timing before the compression top dead center, the mixture gas combusts by flame propagation. After the start of the combustion by flame propagation, unburnt mixture gas carries out self-ignition to perform CI combustion. The fuel injected by the late-stage injection mainly carries out SI combustion. The fuel injected by the early-stage injection mainly carries out CI combustion. When performing the early-stage injection during a compression stroke, the fuel injected by the early-stage injection can be prevented from inducing abnormal combustion, such as premature ignition. Moreover, the fuel injected by the late-stage injection can be stably combusted by flame propagation.

Also in the high-load range (C), the engine system 1 performs SPCCI combustion, similar to the low-load range (A) and the middle-load range (B). The EGR system 55 introduces EGR gas into the combustion chamber 17, when the operating state of the engine system 1 is in the high-load range (C). The engine system 1 reduces an EGR gas amount as the load increases. At the full load, the EGR gas amount may be set to 0.

When the engine system 1 operates in the high-load range (C), the air-fuel ratio (A/F) of mixture gas is set to the stoichiometric air-fuel ratio throughout the combustion chamber 17. When the engine system 1 is in the high-load range (C), the injector 6 injects fuel into the combustion chamber 17 in a single injection, from an intake stroke to a compression stroke. The injection may be performed from the second half of the intake stroke to the first half of the compression stroke.

On the other hand, also in the high-load range (C), the opening of the swirl control valve 20 is set to 12%, and, thereby, the intake air flow is strengthened. Thus, the intake air flow by the swirl control valve 20 is strengthened substantially in the low-load range (A) and the high-load range (C), and is weakened in the middle-load range (B). Note that in the high-load range (C), since the fuel injection amount is comparatively large and the EGR gas amount is decreased, the mixture gas is easy to ignite. However, in the high-load range (C), the ignition timing by the ignition plug 25 is retarded for the purpose of reducing combustion noise, as will be described later. Since retarding the ignition timing tends to cause a misfire, combustibility is improved by strengthening the intake air flow.

When a strong swirl flow is generated in the combustion chamber 17, the fuel of the early-stage injection forms the mixture gas in the central part of the combustion chamber 17. The mixture gas in the central part mainly combusts by SI combustion. The fuel of the late-stage injection mainly forms the mixture gas in the perimeter part of the combustion chamber 17. The mixture gas in the perimeter part mainly combusts by CI combustion.

In the fuel injection in which the early-stage injection and the late-stage injection are performed, the fuel concentration of the mixture gas in the perimeter part of the combustion chamber is richer than the fuel concentration of the mixture gas in the central part, and the fuel amount of the mixture gas in the perimeter part is more than the fuel amount of the mixture gas in the central part. Therefore, the injection amount of the early-stage injection may be made larger than the injection amount of the late-stage injection. A ratio of the injection amount of the early-stage injection to the injection amount of the late-stage injection may be 7:3, as one example.

Next, in the high-load middle-speed range (C'), the air-fuel ratio (A/F) of mixture gas is set to the stoichiometric air-fuel ratio throughout the combustion chamber 17. Moreover, in the high-load middle-speed range (C'), the opening of the swirl control valve 20 is set to 20%. Therefore, the intake air flow is set is stronger than the middle-load range (B) and somewhat weaker than the high-load range (C). That is, in the high-load middle-speed range (C'), the fuel injection timing is advanced more than the high-load range (C). Therefore, since the atomization of the injected fuel progresses and the fuel becomes easier to ignite, the intake air flow can be weakened more than the high-load range (C).

In the high-speed range (D), the engine speed of the engine system 1 becomes higher, and the time required for the crank angle to change by 1° becomes shorter. Therefore, for example, in the high-speed range of the high-load range, it becomes difficult to stratify the mixture gas inside the combustion chamber 17 because the divided injection is performed during a compression stroke, as described above. When the engine speed of the engine system 1 becomes high, it becomes difficult to perform SPCCI combustion described above. Therefore, while the engine system 1 operates in the high-speed range (D), the engine system 1 performs not SPCCI combustion but SI combustion. Note that the high-speed range (D) extends in the load direction from low load to high load.

The EGR system 55 introduces EGR gas into the combustion chamber 17, when the operating state of the engine system 1 is in the high-speed range (D). The engine system 1 reduces the EGR gas amount as the load increases. In the full load, the EGR gas amount may be set to 0. When the engine system 1 operates in the high-speed range (D), the air-fuel ratio (A/F) of the mixture gas is, fundamentally the stoichiometric air-fuel ratio (A/F=14.7:1) throughout the combustion chamber 17. The excess air factor λ of the mixture gas may be set to 1.0±0.2. Note that in the high-load range including the full load in the high-speed range (D), the excess air factor λ of the mixture gas may be less than 1.

When the engine system 1 operates in the high-speed range (D), the injector 6 starts a fuel injection during an intake stroke. The injector 6 injects all the fuel at once. Moreover, the fuel injection period varies according to the fuel injection amount. By starting the fuel injection during the intake stroke, the homogeneous or substantially homogeneous mixture gas can be formed inside the combustion chamber 17. Moreover, since a fuel vaporization time can be secured for as long as possible when the engine speed of the engine system 1 is high, the unburned fuel loss can also be reduced. The ignition plug 25 ignites the mixture gas at a suitable timing before a compression top dead center after the fuel injection is finished. Thus, in the high-speed range (D), sufficient combustion stability can be secured without strengthening the intake air flow. Therefore, in the high-speed range (D), the opening of the swirl control valve 20 is set to 90%, and the strengthening of the intake air flow by the swirl control valve 20 becomes substantially 0.

Figure 7:
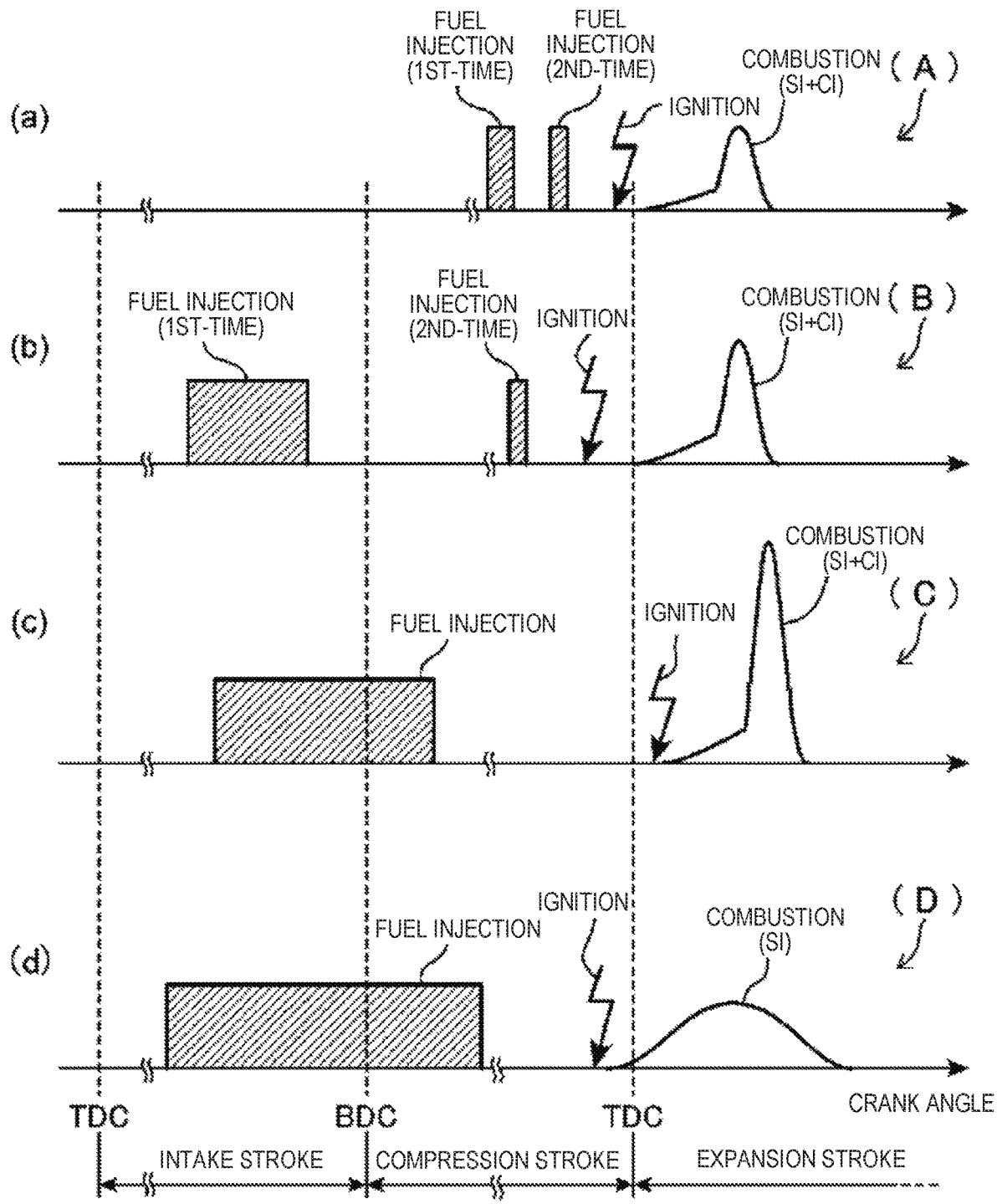
FIG. 7 illustrates schematic charts of timings at which fuel injection are performed and heat is generated with respect to a crank angle, in each operating range of the engine system according to the embodiment of the present disclosure.
Figure 8:
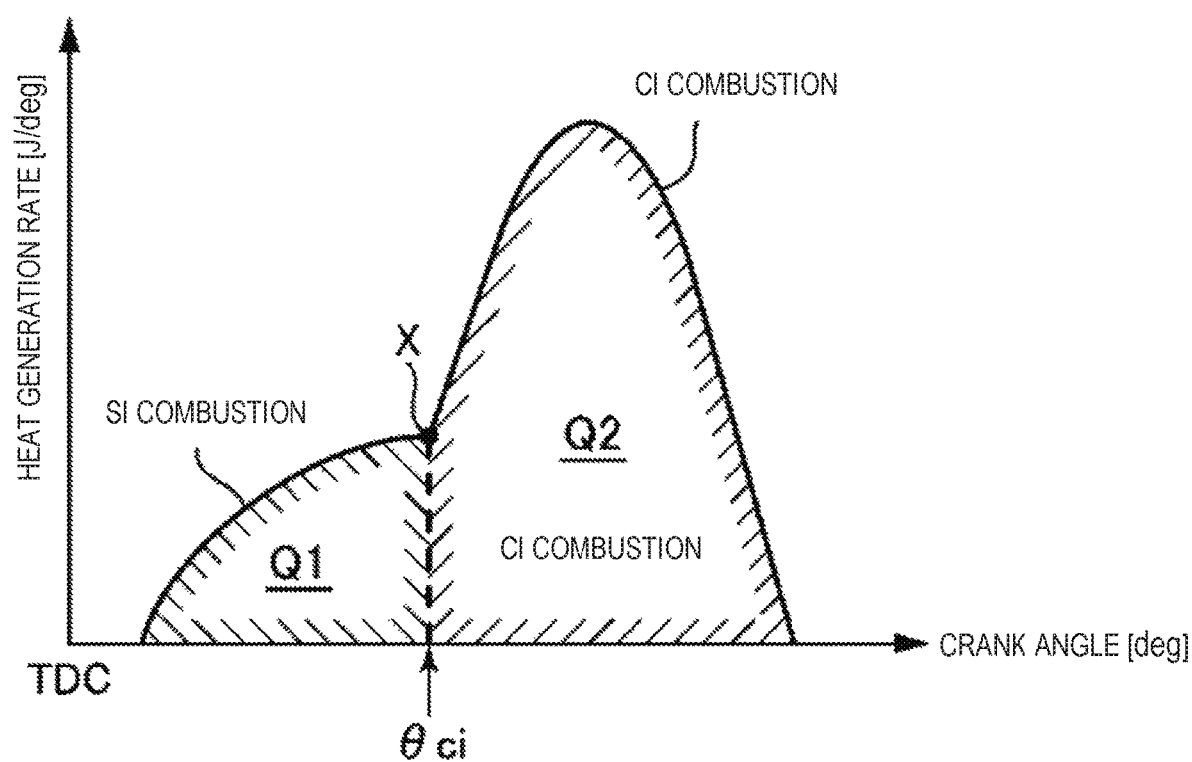
FIG. 8 is a graph schematically illustrating a rate of heat release with respect to the crank angle in the engine system according to the embodiment of the present disclosure.

Next, the timings of the fuel injection and the ignition, and the generation of heat inside the combustion chamber are described with reference to FIGS. 7 and 8. FIG. 7 is a view schematically illustrating the timings at which the fuel injection and the generation of heat occur according to the crank angle in each operating range. FIG. 8 is a graph schematically illustrating a rate of heat release with respect to the crank angle.

As illustrated in FIG. 8, in SPCCI combustion, the heat release during SI combustion becomes lower than the heat release during CI combustion. For example, a waveform of the rate of heat release when SPCCI combustion is performed, a rising slope becomes relatively shallow. Moreover, a pressure fluctuation inside the combustion chamber 17 (i.e., dP/dθ: P is an in-cylinder pressure and θ is a crank angle) also becomes lower during SI combustion than during CI combustion. In other words, the waveform of the rate of heat release during SPCCI combustion is formed so that a first heat release rate part (a part illustrated by Q1) where the rising slope formed by SI combustion is relatively shallow, and a second heat release rate part (a part illustrated by Q2) where the rising slope formed by CI combustion is relatively steep, are continuous in this order.

When the temperature and the pressure inside the combustion chamber 17 are increased by SI combustion, unburnt mixture gas self-ignites in connection with the increase in the temperature and the pressure, thereby starting CI combustion. At this timing of self-ignition (i.e., a timing at which CI combustion starts), the slope of the waveform of the rate of heat release changes from shallow to steep. That is, the waveform of the rate of heat release in SPCCI combustion rises rapidly at a timing where CI combustion starts (indicated by an "X" of FIG. 8). Thus, by adjusting the timings of the fuel injection and the ignition according to the operating range, the generation of SI combustion and CI combustion can be controlled, and a combustion center of gravity can be set at a desired timing with respect to the crank angle.

After the start of CI combustion, SI combustion and CI combustion are performed in parallel. Since CI combustion is larger in the heat release than SI combustion, the rate of heat release becomes relatively high. However, since CI combustion is performed after a compression top dead center, the slope of the waveform of the rate of heat release will not become excessive. That is, since a motoring pressure decreases by a descent of the piston 3 after passing through the compression top dead center, the increase in the rate of heat release is reduced, and, as a result, dp/dθ during CI combustion is avoided from becoming excessive. Thus, in SPCCI combustion, because of the nature of CI combustion being performed after SI combustion, dp/dθ used as an index of combustion noise is unlikely to become excessive, and therefore, combustion noise can be reduced compared with simple CI combustion (when carrying out CI combustion of all the fuel).

SPCCI combustion ends when CI combustion ends. Since CI combustion is fast in the combusting rate compared with SI combustion, it can bring a combustion end timing earlier than the simple SI combustion (when carrying out SI combustion of all the fuel). In other words, in SPCCI combustion, the combustion end timing can be brought closer to the compression top dead center within an expansion stroke. Therefore, in SPCCI combustion, fuel efficiency can be improved compared with the simple SI combustion.

In order to realize the above SPCCI combustion, each part of the engine is controlled by the ECU 10 in the low-load range (A) (FIGS. 5 and 6), as follows. The injector 6 injects the entire amount or a major part of fuel to be injected in one cycle during a compression stroke. For example, the injector 6 injects fuel in two stages from a middle period to a later period of the compression stroke, as illustrated in Chart (a) of FIG. 7.

The ignition plug 25 ignites the mixture gas near a compression top dead center. For example, the ignition plug 25 preferably ignites the mixture gas at a timing slightly on the advancing side of the compression top dead center. Then, SPCCI combustion is started triggered by this ignition, a portion of the mixture gas inside the combustion chamber 17 combusts by flame propagation (SI combustion), and the remaining mixture gas then combusts by self-ignition (CI combustion). Note that the fuel injection amount (fuel injection period), the fuel injection timing, the ignition timing, etc. illustrated in each chart of FIG. 7 are examples in each operating range, and therefore, they are suitably changed according to the engine speed and/or the load even in the same operating range.

Moreover, in the middle-load range (B) (FIGS. 5 and 6), each part of the engine is controlled by the ECU 10, as illustrated in Chart (b) of FIG. 7. That is, the injector 6 performs a first fuel injection during an intake stroke and performs a second fuel injection in the middle period of a compression stroke. Moreover, the ignition plug 25 ignites the mixture gas at a timing, for example, on the advancing side of a compression top dead center.

Further, in the high-load range (C) (FIGS. 5 and 6), each part of the engine is controlled by the ECU 10, as illustrated in Chart (c) of FIG. 7. That is, the injector 6 performs the fuel injection from the intake stroke to the compression stroke. Moreover, the ignition plug 25 ignites the mixture gas at a timing, for example, slightly on the retarding side of the compression top dead center. Therefore, since the combustion center of gravity moves to the retarding side (retarded), combustion noise can be reduced.

Moreover, in the high-speed range (D) (FIGS. 5 and 6), each part of the engine is controlled by the ECU 10, as illustrated in Chart (d) of FIG. 7. That is, the injector 6 performs the fuel injection from the intake stroke to the compression stroke. Moreover, the ignition plug 25 ignites the mixture gas at a timing, for example, slightly on the advancing side of the compression top dead center. In the high-speed range, not SPCCI combustion but SI combustion is performed, and SI combustion of all the injected fuel is carried out.

Figure 9:
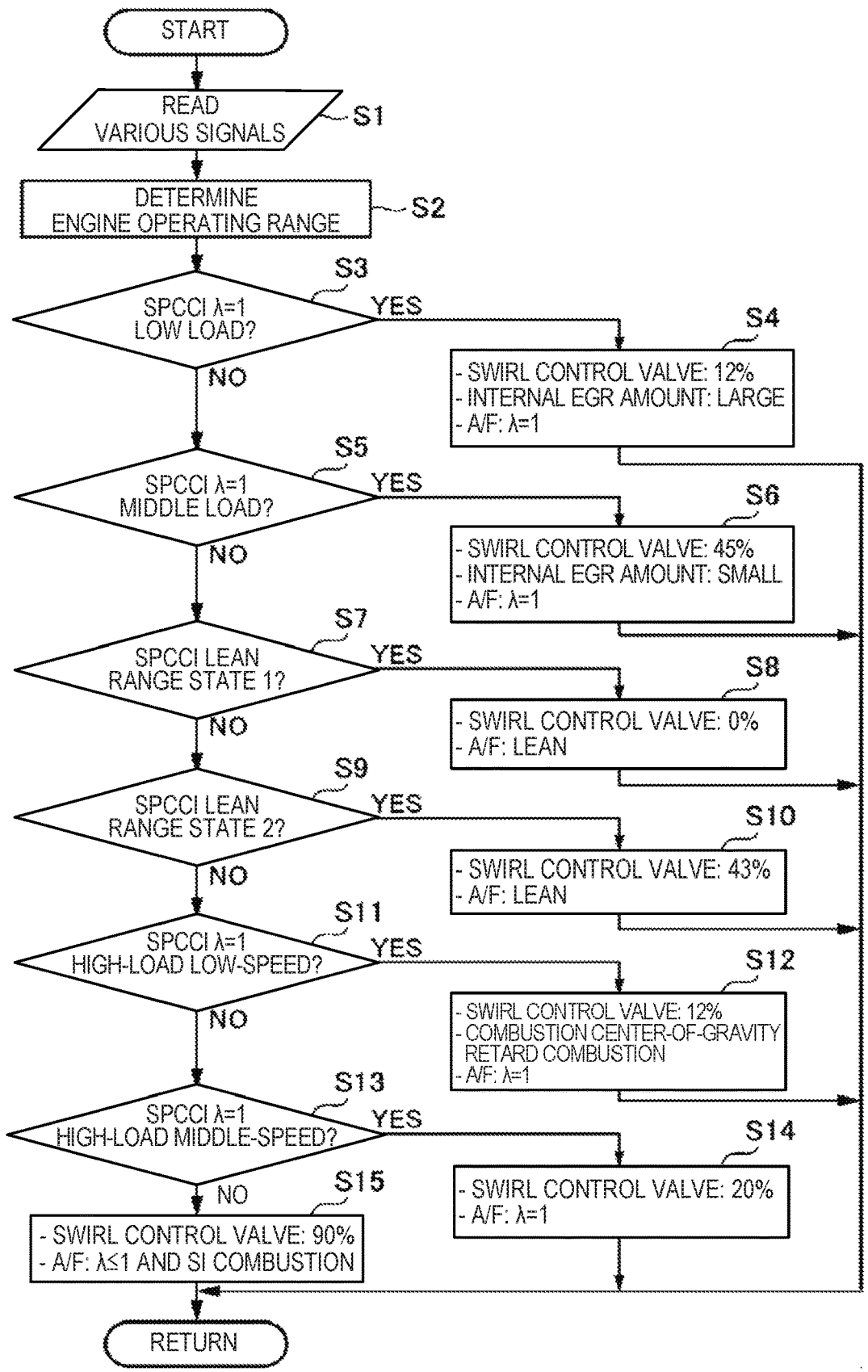
FIG. 9 is a flowchart illustrating a control executed by an ECU of the engine system according to the embodiment of the present disclosure.

Next, referring to FIG. 9, operation of the engine system 1 according to the embodiment of the present disclosure is described. FIG. 9 is a flowchart illustrating a control executed by the ECU 10 of the engine system 1. Note that the flowchart illustrated in FIG. 9 is repeatedly executed at a given time interval, while the engine system 1 is operating.

First, at Step S1 of FIG. 9, the detection signals detected by the various sensors connected to the ECU 10 are read into the ECU 10. The detection signals read at Step S1 at least include detection signals detected by the engine speed sensor SW9, the water temperature sensor SW10, and the accelerator opening sensor SW12. Next, at Step S2, the operating state of the engine system 1 is identified based on the detection signals read at Step S1.

Further, at Step S3, it is determined whether the operating state identified at Step S2 is the low-load range. In detail, it is first determined whether the water temperature detected by the water temperature sensor SW10 is lower than 80° C., and if it is lower than 80° C., the map illustrated in FIG. 5 is applied, and on the other hand, if it is 80° C. or higher, the map illustrated in FIG. 6 is applied. Next, it is determined whether the engine speed detected by the engine speed sensor SW9 and the target load detected by the accelerator opening sensor SW12 fall within the low-load range (A) of the applied map. If they fall within the low-load range (A), the process shifts to Step S4, or otherwise, the process shifts to Step S5.

At Step S4, the air-fuel ratio (A/F) is set to the stoichiometric air-fuel ratio (A/F=14.7:1, where the excess air factor $\lambda$=1), and increases the internal EGR amount. Further, the opening of the swirl control valve 20 is set to 12% to give a comparatively strong intake air flow. That is, the ECU 10 sends the control signals to the injector 6, the swirl control valve 20, the intake electric VVT 23, the exhaust electric VVT 24, and the ignition plug 25 to perform SPCCI combustion in which the comparatively strong intake air flow is given. Therefore, the stability of the combustion in the low-load range where the fuel injection amount is small can be improved. After executing the above processing, one sequence of processing of the flowchart illustrated in FIG. 9 is ended.

On the other hand, at Step S5, it is determined whether the operating state identified at Step S2 falls within the middle-load range. In detail, first, if the detected water temperature is lower than 80° C., the map illustrated in FIG. 5 is applied, and if it is 80° C. or higher, the map illustrated in FIG. 6 is applied. Next, it is determined whether the detected engine speed and the detected target load fall within the middle-load range (B) of the applied map. If they fall within the middle-load range (B), the process shifts to Step S6, or otherwise, the process shifts to Step S7. Note that when the applied map is the map of FIG. 6 and the identified operating state falls within the hatched part of FIG. 6, the process shifts to Step S7.

At Step S6, the air-fuel ratio (A/F) is set to the stoichiometric air-fuel ratio ($\lambda$=1), and reduces the internal EGR amount. Further, the opening of the swirl control valve 20 is set to 45% to make the intake air flow weaker than that in the low-load range (A). That is, the ECU 10 sends the control signals to the injector 6, the swirl control valve 20, the intake electric VVT 23, the exhaust electric VVT 24, and the ignition plug 25 to perform SPCCI combustion in which the comparatively weak intake air flow is given. Therefore, in the middle-load range (B) where the combustion is comparatively stable, the intake air flow can be weakened and the generation of the cooling loss can be reduced. After executing the above processing, one sequence of processing of the flowchart illustrated in FIG. 9 is ended.

On the other hand, at Step S7, it is determined whether the operating state identified at Step S2 falls within the hatched part of the map illustrated in FIG. 6, and the water temperature detected by the water temperature sensor SW10 is lower than 100° C. If these conditions are satisfied, the process shifts to Step S8, or otherwise, the process shifts to Step S9.

At Step S8, in order to perform the lean combustion ($\lambda$>1) by SPCCI, the fuel injection amount is set, and the opening of the swirl control valve 20 is set to 0%. That is, since the temperature is too low for performing the lean combustion by SPCCI, the opening of the swirl control valve 20 is set to 0% to strengthen the intake air flow to the maximum. That is, the ECU 10 sends the control signals to the injector 6, the swirl control valve 20, the intake electric VVT 23, the exhaust electric VVT 24, and the ignition plug 25 to perform the lean combustion by SPCCI in which the strong intake air flow is given. Thus, flame propagation capability inside the combustion chamber 17 is increased, and the lean combustion by SPCCI can be carried out stably. After executing the above processing, one sequence of processing of the flowchart illustrated in FIG. 9 is ended.

On the other hand, at Step S9, it is determined whether the operating state identified at Step S2 falls within the hatched part of the map illustrated in FIG. 6, and the water temperature detected by the water temperature sensor SW10 is 100° C. or higher. If these conditions are satisfied, the process shifts to Step S10, or otherwise, the process shifts to Step S11.

At Step S10, in order to perform the lean combustion ($\lambda$>1) by SPCCI, the fuel injection amount is set, and the opening of the swirl control valve 20 is set to 43%. That is, since the temperature is sufficiently high to perform the lean combustion by SPCCI, the swirl control valve 20 opening is set to 43%, and the intake air flow is set weaker than the low-load range (A). The ECU 10 sends the control signals to the injector 6, the swirl control valve 20, the intake electric VVT 23, the exhaust electric VVT 24, and the ignition plug 25 to perform the lean combustion by SPCCI in which the comparatively weak intake air flow is given. Therefore, cooling loss can be reduced. Moreover, the intake air flow set at Step S10 is set slightly stronger than that in the middle-load range (B) outside the hatched part of the map, and therefore, the stable combustion can be performed also by the lean combustion. After executing the above processing, one sequence of processing of the flowchart illustrated in FIG. 9 is ended.

On the other hand, at Step S11, it is determined whether the operating state identified at Step S2 falls within the high-load range (C). In detail, first, if the detected water temperature is lower than 80° C., the map illustrated in FIG. 5 is applied, on the other hand, if it is 80° C. or higher, the map illustrated in FIG. 6 is applied. Next, it is determined whether the detected engine speed and the detected target load fall within the high-load range (C) of the applied map. If they fall within the high-load range (C), the process shifts to Step S12, or otherwise, the process shifts to Step S13.

At Step S12, the air-fuel ratio (A/F) is set to the stoichiometric air-fuel ratio ($\lambda=1$). Further, the opening of the swirl control valve 20 is set to 12% to set the intake air flow stronger than that in the middle-load range (B). The ECU 10 sends the control signals to the injector 6, the swirl control valve 20, the intake electric VVT 23, the exhaust electric VVT 24, and the ignition plug 25 to perform SPCCI combustion in which the comparatively strong intake air flow is given. That is, as described above, since the ignition timing of the ignition plug 25 is retarded in the high-load range (C) in order to reduce the combustion noise, the combustion tends to become unstable. Therefore, in the high-load range (C), the intake air flow is strengthened more than the middle-load range (B) to stabilize SPCCI combustion. After executing the above processing, one sequence of processing of the flowchart illustrated in FIG. 9 is ended.

On the other hand, at Step S13, it is determined whether the operating state identified at Step S2 falls within the high-load middle-speed range (C'). In detail, first, if the detected water temperature is lower than 80° C., the map illustrated in FIG. 5 is applied, and if it is 80° C. or higher, the map illustrated in FIG. 6 is applied. Next, it is determined whether the detected engine speed and the detected target load fall within the high-load middle-speed range (C') of the applied map. If they fall within the high-load middle-speed range (C'), the process shifts to Step S14, or otherwise, the process shifts to Step S15.

At Step S14, the air-fuel ratio (A/F) is set to the stoichiometric air-fuel ratio ($\lambda=1$), and the opening of the swirl control valve 20 is set to 20%. That is, in the high-load middle-speed range (C'), the intake air flow is set stronger than that in the middle-load range (B) and weaker than that in the high-load range (C). The ECU 10 sends the control signals to the injector 6, the swirl control valve 20, the intake electric VVT 23, the exhaust electric VVT 24, and the ignition plug 25 to perform SPCCI combustion in which the slightly stronger intake air flow is given. That is, in the high-load middle-speed range (C'), since the injection timing of fuel is more advanced than that in the high-load range (C), the fuel atomization state is improved. Therefore, in the high-load middle-speed range (C'), the intake air flow can be set weaker than that in the high-load range (C). After executing the above processing, one sequence of processing of the flowchart illustrated in FIG. 9 is ended.

At Step S15, SI combustion in which the air-fuel ratio (A/F) is made the stoichiometric air-fuel ratio or richer ($\lambda \leq 1$) than the stoichiometric air-fuel ratio is set. Further, the opening of the swirl control valve 20 is set to 90%, and the intake air flow is set weaker than that in any of the operating ranges. The ECU 10 sends the control signals to the injector 6, the swirl control valve 20, the intake electric VVT 23, the exhaust electric VVT 24, and the ignition plug 25 to perform SI combustion in which the weakest intake air flow is given. That is, since the operating range which does not fall within any of the conditions at Steps S3-S13 corresponds to the high-speed range (D), the operating condition of the high-speed range (D) is set at Step S15, and one sequence of processing of the flowchart illustrated in FIG. 9 is ended. Thus, by setting the opening of the swirl control valve 20 according to each operating range, the more suitable intake air flow is given, and thereby, the generation of the cooling loss can be reduced, while securing sufficient combustion stability.

According to the engine system 1 of the embodiment of the present disclosure, the swirl control valve 20 which is the intake air flow control valve is controlled so that the intake air flow in the given middle-load range (B) becomes weaker than those in the high-load range (C) and the low-load range (A) (FIGS. 5 and 6). By weakening the intake air flow in the middle-load range (B), the cooling loss can be reduced, while securing sufficient combustion stability.

Moreover, according to the engine system 1 of this embodiment, since the swirl control valve 20 (FIG. 3) which generates the swirl inside the combustion chamber is used as the intake air flow control valve, combustion stability can be effectively improved by intake air flow.

Further, according to the engine system 1 of this embodiment, since the intake air flow is strengthened in the high-load range (C), the partial compression ignition (SPCCI) combustion can be stabilized even when the ignition timing is retarded (Chart (c) of FIG. 7), and therefore, stable combustion can be obtained, while combustion noise is reduced.

Moreover, according to the engine system 1 of this embodiment, since the intake air flow is strengthened in the low-load range (A), sufficient combustion stability can be secured, even if the internal exhaust recirculation (internal EGR amount) amount is increased in the low load operation.

Further, according to the engine system 1 of this embodiment, since the ignition plug 25 is disposed in the circumferential part inside the combustion chamber 17 (FIG. 2), the deterioration of the cooling loss caused by the intake air flow around the ignition plug 25 can be reduced.

Moreover, according to the engine system 1 of this embodiment, since the ignition plug 25 is disposed in the circumferential part of the combustion chamber 17 on the side where the intake valve 21 is provided (FIG. 2), the deterioration of the cooling loss caused by the intake air flow near the intake side where the ignition plug 25 is disposed can be reduced.

As described above, although the desirable embodiment of the present disclosure is described, various changes may be made to the above embodiment. Particularly, in the above embodiment, although the swirl control valve is used as the intake air flow control valve, the intake air flow control valve may cause a tumble flow inside the combustion chamber, or may cause an intake air flow having both of the swirl component and the tumble component.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
3 Piston
6 Injector
10 ECU
11 Cylinder
12 Cylinder Block
13 Cylinder Head
13a, 13b Slope
14 Connecting Rod
15 Crankshaft
17 Combustion Chamber
18 Intake Port 18a First Intake Port
18b Second Intake Port
19 Exhaust Port
20 Swirl Control Valve (Intake Air Flow Control Valve)
21 Intake Valve
22 Exhaust Valve
23 Intake Electric VVT
24 Exhaust Electric VVT
25 Ignition Plug
31 Cavity
31a Convex Part
31b Dented Part
40 Intake Passage
41 Air Cleaner
42 Surge Tank
43 Throttle Valve
44 Supercharger
45 Electromagnetic Clutch
46 Intercooler
47 Bypass Passage
48 Air Bypass Valve
49 Supercharging System
50 Exhaust Passage
51 Catalytic Converter
52 EGR Passage
53 EGR Cooler
54 EGR Valve
55 EGR System
61 Fuel Supply System
62 Fuel Supply Path
63 Fuel Tank
64 Common Rail
65 Fuel Supply Pump
SW9 Engine Speed Sensor
SW10 Water Temperature Sensor
SW12 Accelerator Opening Sensor

What is claimed is:

1. An engine system capable of controlling an intake air flow, comprising:
   a combustion chamber;
   an ignition plug disposed inside the combustion chamber;
   an intake air flow control valve configured to generate an intake air flow inside the combustion chamber; and
   a controller configured to control the ignition plug and the intake air flow control valve,
   wherein the controller performs, in at least a part of an operating range, partial compression ignition combustion in which after jump-spark ignition combustion of a portion of a mixture gas inside the combustion chamber by a jump-spark ignition of the ignition plug, compression ignition combustion of the remaining mixture gas inside the combustion chamber is carried out by a self-ignition,
   wherein the controller controls the intake air flow control valve at least in a part of the operating range of the partial compression ignition combustion, such that turbulence in the intake air flow inside the combustion chamber is increased and the intake air is swirled in the combustion chamber,
   wherein the controller controls, in a given middle-load range, higher than a first predetermined load and lower than a second predetermined load higher than the first predetermined load, of the operating range where the partial compression ignition combustion is performed, an opening of the intake air flow control valve to be a first predetermined opening so that the intake air flow becomes weaker than in a high-load range, higher than the second predetermined load, where the load is higher than the middle-load range and a low-load range, lower than the first predetermined load, where the load is lower than the middle-load range,
   wherein the controller controls, in the high-load range of the operating range, the opening of the intake air flow control valve to be a second predetermined opening smaller than the first predetermined opening so that the intake air flow becomes stronger than in the middle-load range, and
   wherein the controller controls, in the low-load range of the operating range, the opening of the intake air flow control valve to be a third predetermined opening smaller than the first predetermined opening so that the intake air flow becomes stronger than in the middle-load range.

2. The engine system of claim 1, wherein the intake air flow control valve is a swirl control valve configured to generate a swirl flow inside the combustion chamber.

3. The engine system of claim 1, wherein the controller controls the ignition plug so that an ignition timing is retarded in the high-load range where the partial compression ignition combustion is performed.

4. The engine system of claim 1, further comprising an intake valve configured to introduce intake air into the combustion chamber, and an exhaust valve configured to discharge exhaust gas after combustion inside the combustion chamber,
   wherein the controller controls the intake valve and the exhaust valve, in the low-load range where the partial compression ignition combustion is performed, to increase an amount of internal exhaust gas recirculation.

5. The engine system of claim 1, wherein the ignition plug is disposed in a circumferential part inside the combustion chamber.

6. The engine system of claim 5, further comprising an intake valve configured to introduce intake air into the combustion chamber,
   wherein the ignition plug is disposed in the circumferential part inside the combustion chamber on the side where the intake valve is provided.

7. The engine system of claim 1, wherein the controller controls, in a middle engine speed range of the high-load range, the opening of the intake air flow control valve to be a fourth predetermined opening smaller than the first predetermined opening.

8. A method of controlling an intake air flow, comprising the steps of:
   controlling an ignition plug disposed inside a combustion chamber and an intake air flow control valve configured to generate an intake air flow inside the combustion chamber to perform, in at least a part of an operating range, partial compression ignition combustion in which after jump-spark ignition combustion of a portion of a mixture gas inside the combustion chamber by a jump-spark ignition of the ignition plug, compression ignition combustion of the remaining mixture gas inside the combustion chamber is carried out by a self-ignition;
   controlling the intake air flow control valve at least in a part of the operating range of the partial compression ignition combustion, such that turbulence in the intake air flow inside the combustion chamber is increased and the intake air is swirled in the combustion chamber;
   controlling, in a given middle-load range of the operating range, higher than a first predetermined load and lower than a second predetermined load higher than the first predetermined load, where the partial compression ignition combustion is performed, an opening of the intake air flow control valve to be a first predetermined opening so that the intake air flow becomes weaker than in a high-load range, higher than the second predetermined load, where the load is higher than the middle-load range and a low-load range, lower than the first predetermined load, where the load is lower than the middle-load rang, controlling, in the high-load range of the operating range, the opening of the intake air flow control valve to be a second predetermined opening smaller than the first predetermined opening so that the intake air flow becomes stronger than in the middle-load range, and controlling, in the low-load range of the operating range, the opening of the intake air flow control valve to be a third predetermined opening smaller than the first predetermined opening so that the intake air flow becomes stronger than in the middle-load range.

9. The method of claim 8, further comprising: controlling, in a middle engine speed range of the high-load range, the opening of the intake air flow control valve to be a fourth predetermined opening smaller than the first predetermined opening.

* * * * *